United States Patent [19]

Caplan

[11] 4,064,872
[45] Dec. 27, 1977

[54] TEMPERATURE MEASURING DEVICE OF A LIQUID CRYSTAL LAMINATE

[75] Inventor: Sandor Caplan, Lawrenceville, N.J.

[73] Assignee: Ashley-Butler, Inc., Somerville, N.J.

[21] Appl. No.: 719,730

[22] Filed: Sept. 2, 1976

[51] Int. Cl.² ........................... A61B 6/10; C09K 3/34
[52] U.S. Cl. .................................... 128/2 H; 428/913;
428/1; 428/72; 428/178; 428/179; 428/354;
428/461; 350/160 LC; 252/299; 73/356
[58] Field of Search ................... 428/518, 515, 1, 354,
428/461, 72, 178, 179; 350/160 LC; 252/299;
73/356; 128/2 H

[56] References Cited

U.S. PATENT DOCUMENTS

| | | | |
|---|---|---|---|
| 3,533,399 | 10/1970 | Goldberg et al. | 128/2 |
| 3,590,371 | 6/1971 | Shaw, Jr. | 324/51 |
| 3,847,139 | 11/1974 | Flam | 428/1 X |
| 3,908,052 | 9/1975 | Sanders | 428/1 |
| 3,951,133 | 4/1976 | Reese | 428/1 X |

Primary Examiner—P. C. Ives
Attorney, Agent, or Firm—Cooper, Dunham, Clark, Griffin & Moran

[57] ABSTRACT

Device for measuring temperature differentials on mammalian skin surfaces comprising separate dots of liquid crystals, sealed in a grid pattern between thin, performed, flexible films.

13 Claims, 3 Drawing Figures

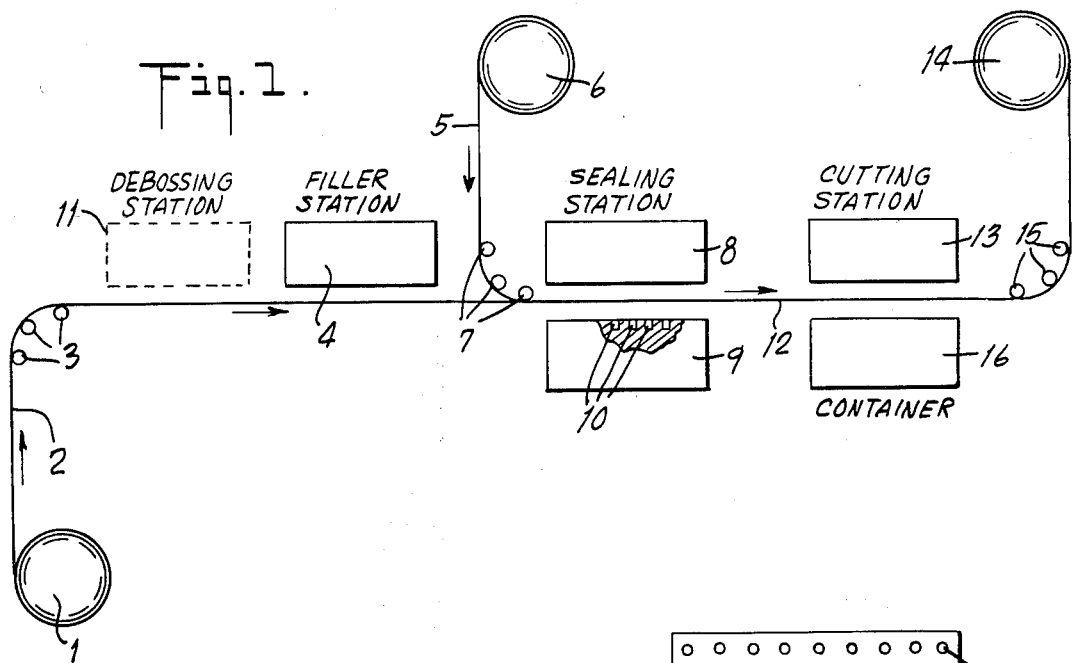
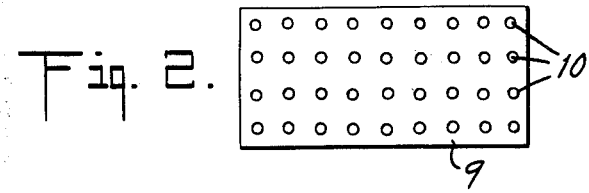
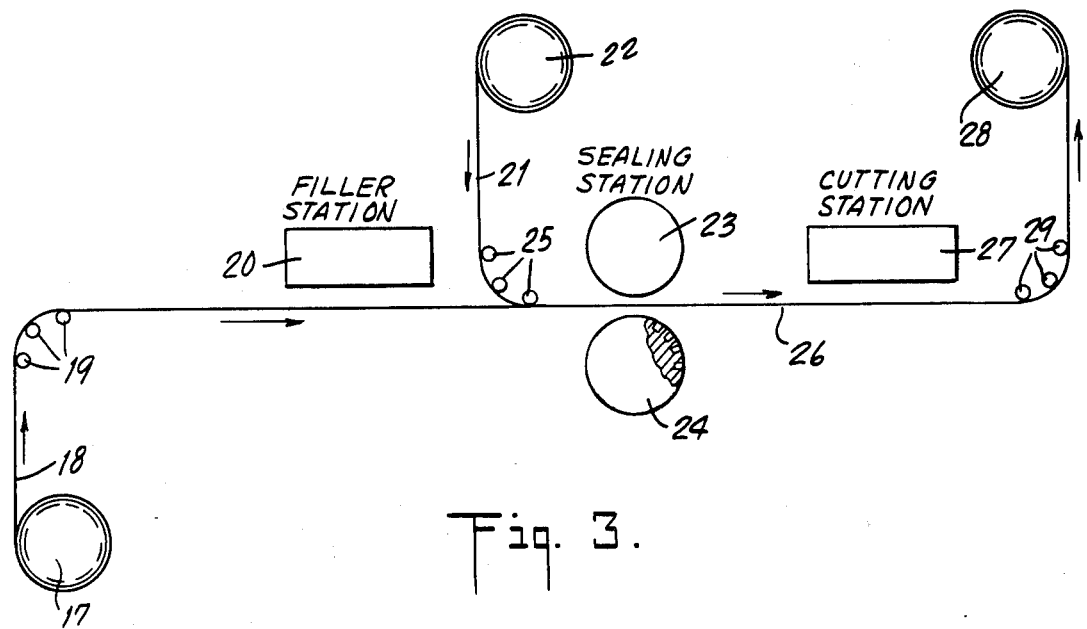

TEMPERATURE MEASURING DEVICE OF A LIQUID CRYSTAL LAMINATE

BACKGROUND OF THE INVENTION

A number of physiological abnormalities manifest themselves in temperature differentials in adjacent skin areas. Trauma to the extremities cause such differentials. The trauma may involve the soft tissues with an inflammatory reaction, in which case the temperature is increased, or it may involve arteries with obliteration, in which case cooling will result. When nerves are damaged, a causalgic-like reaction is common. This may be characterized by either decreased or increased heat, depending upon whether the sympathetic nerve is irritated by the trauma (with stimulation of the nerve fibers and vasoconstriction) or if the nerve is completely severed, in which case a sympathectomy effect occurs with vasodilation.

Breast cancer is the most frequent form of fatal cancer in women and accounts for one-fifth of all female malignancies. It has been estimated that five of every one hundred women will develop breast cancer at some time during their lives. When breast cancer occurs, even with present day methods of treatment, it produces a staggering mortality, making breast cancer the number two killer of women. These deaths are even more regrettable, since the lesions give rise to lumps in an organ at the surface of the body that should easily be detected with the technology of today.

Breast carcinomas are first recognized as palpable masses by our present methods. The final diagnosis cannot be made by palpation because there are many benign breast disorders which give rise to similar masses. Benign tumors occur frequently. Consequently, the final diagnosis rests on biopsies or needle aspirations and microscopic examination. Once detected, breast carcinomas are treated by radical mastectomy and sometimes radiotherapy.

Successful treatment of breast cancer depends largely upon its stage of development at detection. If metastasis has not occurred beyond the auxiliary lymph nodes, the cancer may be completely abated. Usually, a malignant tumor cannot be recognized until it is one centimeter is diameter. Generally, regional adenopathy and dissemination do not occur at this state. However, this is not always the case, as the stage of cancer development is not directly related to the mass size. Regardless, the earliest possible diagnosis and treatment of a breast carcinoma is desirable because the possiblity of metastasis to vital areas increase with time.

Breast cancer has been observed to grow on a linear scale from the time of clinical recognition until terminal acceleration in the phases of systematic dissemination. Projection of the linear scale into the preclinical or occult stage suggests that the carcinoma has been present for many years. Therefore, there must be some symptoms available when the carcinoma is in the preclinical stage such that recognition might be feasible by combined clinical and screening techniques. The fact that cases recognized in mass screening programs are identified 21 months earlier than would be possible by clinical palpation is promising, and groups these cases in the preclinical stage.

The most widely accepted technique for early diagnosis of breast cancer is X-ray mammography. The lesion is seen as an area of increased tissue density with spotty calcifications. This technique has been used with some success. However, there are several drawbacks which have limited its use to cases in which there is a suspected carcinoma. Mammography has been of little value for the detection of breast cancer in women younger than 30 years due to the high density of the younger breast. Mammography also has practical limitations with its expense and time required by radiologists and technicians.

Thermography is the most recent method aiding in the diagnosis and screening of breast cancer. Many researchers have screened large numbers of women with and without suspicious breast characteristics using infrared radiation from the skin. The infrared emission is proportional to the fourth exponent of the temperature. A thermal pattern is recorded as a permanent black and white scan. Though IR thermography has been more successful than X-ray mammography, its application for diagnosis and screening is limited due to the high instrumentation cost.

Thermography is a method employed to map a surface temperature pattern. Ideally, a thermographic technique should give a quantitative, instantaneous thermogram equivalent to the largest possible number of individual temperature measurements per unit area with a high degree of optical resolution and sensitivity.

Cholesteric liquid crystals have unusually high thermal sensitivity. When applied to a blackened surface, these materials give rise to iridescent colors, the dominant wavelength being influenced by a very small temperature change. Liquid crystal thermography is capable of producing a thermogram over a large area with a temperature sensitivity of 0.1° C and resolution of 1000 lines per inch.

Cholesteric liquid crystals demonstrate color-temperature sensitivity when in the cholesteric phase. The cholesteric phase is exhibited by many esters of cholesterol and several other organic compounds. These compounds are members of the larger class of molecular order called the mesomorphic or liquid crystalline phases. All members of this group exhibit a state of matter with an order of molecular arrangement intermediate between a true three dimensional crystal and a liquid. These compounds demonstrate the cholesteric phase within a specific temperature range, below and above which they exist as three dimensional solids and liquids, respectively.

Many efforts have been made to utilize liquid crystals in thermography of the human anatomy. For instance, the crystals have been encapsulated in natural and synthetic polymers and formed into thin sheets. This procedure does not yield a high resolution means for detecting small temperature differences because of the high heat capacities of the polymers. The heat of the body is taken up by the polymers so that the liquid crystals are not sufficiently affected to manifest small temperature differences in adjacent area segments.

Other attempts have been made to enclose liquid crystals in various kinds of polymer matrices. The products produced have not been satisfactory because of interference with the expected liquid crystal reaction by solvent contamination.

U.S. Pat. No. 3,590,371 by Hugh Shaw, Jr. layers the liquid crystal between two transparent flexible pieces of plastic. However, in this approach, no means has been provided for keeping the normally viscous, fluid liquid crystal contained between the plastic pieces, and no means has been provided for giving protection to the liquid crystal from contamination at the edges of the sandwich. Further, such a "sandwich" is delicate to handle since the two plastic pieces slip on each other with the liquid crystal acting as a lubricant.

Additionally, the liquid crystals themselves tend to flow within the package so that in some sections of the package the liquid crystal layer is thicker than in other sections. These sections, of course, have higher heat capacities than the thinner sections so that true temperature differentials on the skin surface are not faithfully recorded.

Another method in which liquid crystals have been used on the skin to detect tumors and other temperature phenomena of diseases and disorders of the body has been described in U.S. Pat. No. 3,533,399. In accordance with the procedure of the patent, the skin is coated with an application of polyvinyl alcohol and carbon black. The polyvinyl alcohol layer is allowed to dry; then a layer of liquid crystals is applied over the polyvinyl alcohol layer. The carbon black is needed to provide a sufficiently dark background to view the colors of the liquid crystal. This technique has severe limitations since the liquid crystal can only be used once. Additionally, the procedure is messy, and it is difficult to remove the polyvinyl alcohol and liquid crystal applications by washing.

U.S. Pat. No. 3,908,052 refers to a laminate which is two polymeric layers, at least the top layer being substantially transparent, sandwiching a layer of liquid crystals. The top polymer film is bonded to the bottom film in a grid pattern by heat sealing through the layer of liquid crystals. Heat sealing through liquid crystal layers is an old technique which has been employed, for example, for the preparation of novelty items in which a layer of liquid crystals is sandwiched between two polymer films and heat sealed in a selected design, for example, a bird or animal design.

Products formed by heat sealing through liquid crystals have been found generally unsuitable for temperature sensing devices requiring high sensitivity and good stability since heat sealing through the crystals contaminates them.

The procedures heretofore utilized to obtain thermograms of the human skin with liquid crystals have suffered from one or more of the following problems.
 a. Heat capacity of product components other than liquid crystals is too high.
 b. The products are expensive to prepare.
 c. The products cannot be sterilized.
 d. The products are not sufficiently flexible to conform to the skin areas under test.
 e. The products do not satisfactorily protect the liquid crystals from the environment.
 f. The products do not provide for uniformly thin layers of liquid crystals suitable for rapid and accurate response to temperature differentials.
 g. The products do not have sufficient sensitivity and stability to be relied upon as a useful medical tool.

THE INVENTION

This invention makes possible the accurate and reproducible determination of temperature differentials with high resolution by providing an inexpensive device which is flexible, easy to use, stable, sensitive and may be used repeatedly without loss of any of its advantages.

The invention provides a temperature measuring device suitable for measuring temperature differentials of large surfaces. In the device, there are a plurality of separate dots of liquid crystals which change color in a selected temperature range sandwiched between two thin, performed, self-supporting, flexible films. The top film is transparent so that color changes in the liquid crystals can be observed. The bottom film is normally opaque. The separate films are sealed together in a grid pattern along narrow seal lines so as to form a multiplicity of separate cells, each cell containing a dot of liquid crystal.

In the device of this invention, each cell is a separate unit. Useful products can be prepared to contain from about 40 to 400 cells per square inch, each cell containing a dot of liquid crystal, each cell surrounded by a thin seal line. A typical grid pattern in which the separate cells are square shape might contain 100 cells per square inch, each cell with an area of 0.01 square inch formed with heat seal lines about 0.01 inch wide.

Ideally, the heat seal line should be sufficiently wide so that a cut can be made without breaking the seal. In this manner, the contained liquid crystals are fully protected from the environment. The separate segments, however, are normally so small that no problem arises if one or more of the seals are broken.

There are a number of advantages to the unique structure of the temperature differential measuring devices of this invention. As aforesaid, the crystals are substantially completely protected from the environment. Additionally, the liquid crystals are prevented from flowing so that the uniformly thin layer initially laid down is stable throughout the useful life of the product. The product is flexible, and may be easily formed to the shape of the portion of the anatomy under test. The heat capacity of the thin plastic film is relatively low so that effectively the crystals are substantially directly exposed to or in contact with the heat source. The products may be repeatedly reused without loss of accuracy. Addtionally, the products are relatively inexpensive to prepare.

Since the cells are formed around dots of the liquid crystals, there is no danger of the liquid crystals being affected by the heat used to form the seal lines, either by the heat itself or by heat accelerated reaction between the crystals and the other components of the final product such as the polymer film, the heat sealant, or any residuals present in these components as a result of their method of manufacture. Moreover, there are substantial savings in the amounts of liquid crystals employed since the crystals are applied as dots rather than layers.

Any of a variety of thin, flexible, preformed polymer films may be used to prepare the products of this invention. Typical examples of such films include polyethylene, polypropylene, polyesters such as polyethylene terephthalate, cellulose acetate, and the like. The top film, that is the film through which the color play of the liquid crystals will be observed, is preferably transparrent, or at least translucent. The film adjacent the surface, the temperature of which is to be measured, is normally opaque.

Various sealants may be employed. Of these, the presently preferred, especially for units requiring high accuracy, are heat sealable polyvinyl chloride and polyvinylidene chloride. These are preferred because they are readily available with extremely low amounts of residual materials which could contaminate the liquid crystals or react with them.

In order to best observe the color play of the liquid crystals, they should be observed against a dark, preferably black, background. Thus the bottom film is preferably rendered opaque by reason of dispersion of suitable dye or pigment in the film. Alternatively, the film may be coated with an opaque coating. One convenient procedure is to disperse channel black, iron oxide or other suitable blackening agent in the film or in the heat seal layer.

For the preparation of the products of this invention, the films are normally from 0.00025 to 0.002 inches in thickness. It has been observed that with most polymer films this thickness provides optimum strength and flexibility without adversely affecting heat transfer from the substrate to the liquid crystals. With films of this thickness, the liquid crystals are the dominant mass component of the product.

Cholesteric liquid crystals which are useful for the practice of this invention may be selected from a wide variety of available materials including, for example cholesteryl halides, such as cholesteryl chloride, cholestryl bromide and cholesteryl iodide: cholesteryl nitrate and other mixed esters of cholesterol and inorganic acids, cholesteryl esters of saturated and unsaturated, substituted and unsubstituted organic acids, especially cholesteryl esters of $C_1$ to $C_{22}$ aliphatic, monocarboxylic acids, e.g., cholesteryl nonanoate, cholesteryl crotonate, cholesteryl chloroformate, cholesteryl chlorodecanoate, cholesteryl chloroeisocanoate, cholesteryl butyrate, cholesteryl caprate, cholesteryl oleate, cholesteryl linolate, cholesteryl linolenate, cholesteryl laurate, cholesteryl erucate, cholesteryl myristate, oleyl cholesteryl carbonate, cholesteryl heptyl carbonate, decyl cholesteryl carbonate; cholesteryl esters of unsubstituted aryl, alkenaryl, aralkenyl, alkaryl and aralkyl organic acids and halogenated derivatives thereof, especially cholesteryl esters of those organic acids containing an aromatic moiety and from 7 to 19 carbon atoms, such as cholesteryl p-chlorobenzoate, cholesteryl cinnamate; cholesteryl ethers, e.g. cholesteryl decyl ether, cholesteryl lauryl ether, cholesteryl oleyl ether, etc.

Some exemplary mixtures of cholesteric liquid crystal materials which can be employed in accordance with this invention include, but are not limited to, the following in which weight percent is based on the total weight:

Mixture I
  Range = 34–36° C
  Composition =
    46% Oleyl Cholesteryl Carbonate
    54% Cholesteryl Nonanoate
    100%
Mixture II
  Range = 33–35° C
  Composition =
    49% Oleyl Cholesteryl Carbonate
    51% Cholesteryl Nonanoate
    100%
Mixture III
  Range = 32–34° C
  Composition =
    52% Oleyl Cholesteryl Carbonate
    48% Cholesteryl Nonanoate
    100%

The liquid crystals or liquid crystal mixtures will, of course, be selected to be responsive to temperature differentials in the temperature range to be measured.

Typically, the thickness of the liquid crystal drops will be from 0.001 to 0.003 inches.

The products of this invention have been described principally as temperature differential measuring devices containing liquid crystals which change color in the temperature range normally encountered on the skin of the mammalian body between two thin, flexible, preformed polymer films, a bottom film which is preferably opaque either inherently or by reason of an opaque coating, and a top film through which color changes in the liquid crystals can be observed; the two films being sealed into a grid pattern comprising a multiplicity of separate cells separated by seal lines, each cell containing a separate portion of liquid crystal composition.

The bottom film is, of course, the film which will be in contact with the area under test. This film may be coated with an adhesive, preferably a pressure sensitive adhesive such as a polymethacrylate, to aid in keeping intimate contact between the measuring device and the surface to be measured.

When reference is made to the temperatures normally encountered on the surface of the skin, the description should be understood in the context for which the devices comprising this embodiment of the invention are intended. The temperature differentials to be measured are those arising because of some actual departure from temperatures typically encountered with healthy individuals. These departures, although very informative to the physician or veterinarian, are, in fact, relatively small in magnitude.

As mentioned above, the seal lines provide a convenient method for cutting the device to any desired shape while, at the same time, protecting the enclosed liquid crystals from contamination. It is not necessary, however, that the cut be made along the seal lines. In fact, in many instances, it will not be convenient to do so. However, even in those instances, only very small amounts of liquid crystals will leak from the device, and the other enclosed segments of liquid crystals will be fully protected. The device can be formed into any desired shape, for example, a brassiere or a previously formed bandage or cast. If desired, it can be sewn into the aforementioned carrier.

Surprisingly, despite the presence of the seal lines, there is substantially no interference with the color pattern formed in the device when it is used for testing. The color patterns of the device correspond to the temperature patterns of the skin.

While particularly useful as medical tools, the products of this invention can be utilized to measure temperature differentials on other surfaces, for example a bearing housing, the surface of a heat exchanger, a pipe for conducting hot or cold liquids, the surface of a vessel in which a clinical reaction is taking place, the temperature of the surface of a fermentation vessel, or any of a large number of other surfaces whether or not they are regular in shape.

A particular advantage of the products of this invention is that they can be made without undue expense to any desired degree of sensitivity and accuracy. For measuring temperature differentials on human skin, differences of as little as 0.1 degree can be meaningful. On the other hand, the temperature of a fermentation vessel can vary by as much as two degrees, or even more without causing concern.

For the preparation of products with sufficient sensitivity to be employed in medical diagnosis, the separate film comprising the heat sealable sheet material should contain less than 50 mg per ream of components which will react with the liquid crystals, either during manufacture or storage. Where the temperature differential to be measured is 1° to 2°, the heat sealable sheet material may contain up to 500 mg per ream of reactive materials. The reactive materials may be residual materials from the manufacturing process such as monomers, solvents and the like which may react with or dissolve in the liquid crystal composition selected and modify the temperature at which color change will take place. Polymer films and heat sealants with low residuals may be obtained commercially or may be prepared. Obviously, it is not necessary to utilize these more expensive manufacturing components when a high degree of accuracy is not necessary.

The processes by which the products of this invention may be prepared will be best understood by reference to the figures in which:

FIG. 1 is a schematic illustration of systems which can be used,

FIG. 2 illustrates a flat platen of a type utilizable in the systems of FIG. 1, and FIG. 3 is a schematic illustration of a second process which may be used to prepare products of this invention.

Referring to FIG. 1, roller 1 is a supply roll for film 2 which passes over guide rolls 3 to filler station 4. Filler station 4 may be of any known design for placing dots of liquid crystals on film 2. If all of the liquid crystals compositions are identical, the dots are conveniently gravure printed on film 2. If the composition will vary, the dots may be deposited by an array of hypodermic needles, each of which is fed by a micropipette. Such systems are well known and need not be described here.

After the film 2 leaves the filling station, it is registered with film 5 from supply roll 6. The film is guided into registry by guide rolls 7. The laminate is formed at the sealing station comprising top platen 8 which is flat and bottom platen 9 which is also flat.

Bottom platen 9 is characterized by a plurality of holes 10, each hole corresponding to a printed dot of liquid crystal composition. Bottom film 2 is brought into registry with platen 9 so that the printed dots are over holes 10. The top platen 8, which is normally the heated platen, is closed for a suitable time and pressure to effect a heat seal.

Surprisingly, the heat seal can be effected without smearing the dots of liquid crystal composition, even if the dots are very close together.

As an assist in registering the array of liquid crystal dots of the holes in the platen 9, one can emboss wells into the substrate film 2, meter the amount of liquid crystal desired into each well, and seat the wells into the platen holes prior to sealing. This is more of a convenience than a necessity. If the procedure is used, a debossing station 11 of any of a number of known designs is placed upstream of the filler station.

After the seal has been formed, the laminate 12 is guided to the cutting station. The design of the cutting station 13 is conventional, so that no details are shown. The cutting station 13 is not essential, but is very convenient, especially if a large number of small units, for example disposable clinical thermometers, are to be prepared from one laminate. In that event, the scrap laminate will be collected on roll 14 after passing guide rolls 15. The cut pieces may be collected in container 16.

On the other hand, the cutting station may be omitted, and the completed laminate collected on roll 14.

If a flat platen is employed, the movement of film 2 and laminate 12 will be indexed movement. For continuous operation, the flat platens 8 and 9 can be replaced with rolls. If rolls are employed, the top roll will normally be the heated roll. The bottom roll will have a plurality of holes on its peripheral surface. Continuous operation is especially useful if the liquid crystal composition dots are all identical, and they are gravure printed. The indexing procedure is especially useful if the dots are of differing composition.

FIG. 3 illustrates the alternate procedure. In the figure, 17 is the supply roll, 18 the film, 19 the guide rolls, and 20 the filler station. The top film 21 is fed from supply roll 22 through the nip of heating roll 23 and roll 24 with relief holes on its peripheral surface. Guide rolls 25 serve to bring the top film into position. The formed laminate 26 then passes cutting station 27, if employed, and the scrap or finished product, as the case may be, is collected on roll 28 after passing guide rolls 29.

In a specific example of the production of the product of this invention, the substrate was a colaminate comprising 0.001 inch aluminum foil undercoated with 0.002 inch polypropylene and overcoated with polyvinyl chloride heat seal composition. The cover film was 0.0005 inch polyethylene terephthalate coated on its underside with polyvinylidene chloride heat seal composition. The volume of each drop of liquid crystal composition was approximately 10 microliters. The dots were laid down by gravure printing at a density of 100 dots per square inch. The density of relief holes on the flat platen was the same as the density of the dots. The cover film was heat sealed onto the aluminum foil between two flat platens.

What is claimed is:

1. A temperature measuring device of high sensitivity and stability comprising a plurality of separate dots of liquid crystals which change color in a selected temperature range, sandwiched between two thin preformed, self-supporting films of heat sealable sheet material containing up to 500 mg per ream of monomeric components of solvents which are reactive with or soluble in the liquid crystal, a bottom opaque film and a top polymer film through which the color changes in the liquid crystals can be observed, the two films being sealed together in a grid pattern along narrow seal lines to form a multiplicity of separate cells, each cell containing a dot of liquid crystal.

2. A device of claim 1 in which the cells are square shaped.

3. A device of claim 1 in which the seal lines are heat seal lines.

4. A device of claim 1 in which the liquid crystals comprise a mixture of 46% by weight oleyl cholesteryl carbonate and 54% by weight cholesteryl nonanoate.

5. A device of claim 1 in which the liquid crystals comprise a mixture of 49% by weight oleyl cholesteryl carbonate and 51% by weight cholesteryl nonanoate.

6. A device of claim 1 in which the liquid crystals comprise a mixture of 52% oleyl cholesteryl carbonate and 48% cholesteryl nonanoate.

7. A device of claim 1 containing up to 50 mg per ream of components which are reactive with respect to or soluble in the liquid crystal.

8. A device of claim 1 wherein the top and bottom films each comprise polyethylene terephthalate coated on the inner surface with heat sealable polyvinylidene chloride.

9. A device of claim 1 wherein the top and bottom films each comprise polyethylene terephthalate coated on the inner surface with heat sealable polyvinyl chloride.

10. A device of claim 1 in which the bottom film comprises polypropylene laminated on its interior surface with aluminum foil.

11. A device of claim 1 in which the bottom film is coated on its outer surface with pressure sensitive adhesive.

12. A device of claim 1 containing from 40 to 400 cells per square inch.

13. A device of claim 2 containing 100 cells per square inch.

* * * * *

UNITED STATES PATENT AND TRADEMARK OFFICE
CERTIFICATE OF CORRECTION

PATENT NO. : 4,064,872
DATED : December 27, 1977
INVENTOR(S) : SANDOR CAPLAN

It is certified that error appears in the above-identified patent and that said Letters Patent are hereby corrected as shown below:

Abstract, line 4, change "performed" to read
-- preformed --;

Column 8, line 38, change "of" to read -- or --.

Signed and Sealed this

Sixth Day of June 1978

[SEAL]

Attest:

RUTH C. MASON
*Attesting Officer*

DONALD W. BANNER
*Commissioner of Patents and Trademarks*